(12) United States Patent
Russell et al.

(10) Patent No.: US 10,632,414 B2
(45) Date of Patent: Apr. 28, 2020

(54) INTEGRATION OF PRESSURE SWING ADSORPTION AND HYDROPROCESSING FOR IMPROVED HYDROGEN UTILIZATION

(71) Applicant: UOP LLC, Des Plaines, IL (US)

(72) Inventors: Bradley P. Russell, Wheaton, IL (US); David A. Wegerer, Lisle, IL (US); Gautam Pandey, Haryana (IN)

(*) Notice: Subject to any disclaimer, the term of this patent is extended or adjusted under 35 U.S.C. 154(b) by 164 days.

(21) Appl. No.: 15/880,091

(22) Filed: Jan. 25, 2018

(65) Prior Publication Data

US 2019/0224611 A1 Jul. 25, 2019

(51) Int. Cl.
*B01D 53/047* (2006.01)
*C01B 3/56* (2006.01)
*B01D 53/04* (2006.01)

(52) U.S. Cl.
CPC ....... *B01D 53/047* (2013.01); *B01D 53/0438* (2013.01); *B01D 53/0454* (2013.01); *C01B 3/56* (2013.01); *B01D 2256/16* (2013.01); *B01D 2257/7022* (2013.01); *B01D 2257/7025* (2013.01); *B01D 2259/40007* (2013.01); *B01D 2259/40041* (2013.01); *B01D 2259/4068* (2013.01); *B01D 2259/40083* (2013.01)

(58) Field of Classification Search
CPC .. B01D 53/04; B01D 53/047; B01D 53/0438; B01D 53/0454; B01D 2256/16; B01D 2256/2259; B01D 2256/40007; B01D 2256/40041; B01D 2256/40083; B01D 2256/4068; B01D 2256/40075; C01B 3/56
USPC .......................... 95/96, 99, 100, 103, 114, 143
See application file for complete search history.

(56) References Cited

U.S. PATENT DOCUMENTS

| 3,986,849 | A | * | 10/1976 | Fuderer | ................ | B01D 53/047 95/100 |
| 4,299,595 | A | * | 11/1981 | Benkmann | ........... | B01D 53/047 95/1 |
| 4,402,712 | A | * | 9/1983 | Benkmann | ........... | B01D 53/047 252/373 |
| 4,690,695 | A | | 9/1987 | Doshi | | |
| 6,565,628 | B2 | * | 5/2003 | Xu | ....................... | B01D 53/047 95/100 |

(Continued)

FOREIGN PATENT DOCUMENTS

| CN | 102350170 B | 12/2014 |
| WO | 2017105792 A1 | 6/2017 |

OTHER PUBLICATIONS

Li et al., "Pressure swing adsorption/membrane hybrid processes for hydrogen purification with a high recovery", Front. Chem. Sci. Eng., 10(2), 255-264. Higher Education Press and Springer-Verlag Berlin Heidelberg 2016.

(Continued)

*Primary Examiner* — Frank M Lawrence, Jr.

(57) ABSTRACT

The invention provides a process for providing a hydrogen stream to a process utilizing hydrogen comprising obtaining a gas stream containing hydrogen and compressing the gas stream to a pressure of at least 600 psig, Then the compressed gas stream is sent to a pressure swing adsorption unit containing a plurality of beds with at least 5 pressure equalization steps to produce a hydrogen stream. The hydrogen stream can then be compressed and sent to a process utilizing hydrogen. The compressed gas stream may be chilled before entering the pressure swing adsorption unit.

18 Claims, 3 Drawing Sheets

(56) References Cited

U.S. PATENT DOCUMENTS

| | | | |
|---|---|---|---|
| 7,591,879 B2 | 9/2009 | Sundaram et al. | |
| 7,692,052 B2 | 4/2010 | Frey et al. | |
| 9,175,233 B2 | 11/2015 | Goldstein et al. | |
| 2005/0098034 A1 | 5/2005 | Gittleman et al. | |
| 2007/0221060 A1* | 9/2007 | Song | B01D 53/047 95/100 |
| 2010/0160699 A1 | 6/2010 | Frey et al. | |
| 2010/0287981 A1* | 11/2010 | Chen | C01B 3/384 62/619 |
| 2011/0100873 A1* | 5/2011 | Viets | B01D 53/0473 208/59 |
| 2012/0174777 A1* | 7/2012 | Baksh | B01D 53/047 95/100 |
| 2014/0033919 A1* | 2/2014 | Deckman | B01D 53/0473 95/100 |
| 2014/0373713 A1* | 12/2014 | Weist, Jr. | B01D 53/047 95/100 |
| 2016/0115024 A1 | 4/2016 | Tsai et al. | |

OTHER PUBLICATIONS

International Search Report and Written Opinion dated Apr. 25, 2019 in corresponding PCT application PCT/US2019/015202.

* cited by examiner

INTEGRATION OF PRESSURE SWING ADSORPTION AND HYDROPROCESSING FOR IMPROVED HYDROGEN UTILIZATION

BACKGROUND OF THE INVENTION

The present invention provides a process for improving hydrogen recovery as well as the overall economics of a reactor complex that includes multiple reactors utilizing hydrogen.

Hydrocracking is a hydroprocessing process in which hydrocarbons crack in the presence of hydrogen and a hydrocracking catalyst to lower molecular weight hydrocarbons. Depending on the desired output, a hydrocracking unit may contain one or more beds of the same or different catalyst. Hydrocracking can be performed with one or two hydrocracking reactor stages. In single stage hydrocracking, only a single hydrocracking reactor stage is used. Unconverted oil may be recycled from the product fractionation column back to the hydrocracking reactor stage. In two-stage hydrocracking, unconverted oil is fed from the product fractionation column to the second hydrocracking reactor stage. Slurry hydrocracking is a slurried catalytic process used to crack residue feeds to gas oils and fuels.

Due to environmental concerns and newly enacted rules and regulations, saleable fuels must meet lower and lower limits on contaminants, such as sulfur and nitrogen. New regulations require essentially complete removal of sulfur from diesel. For example, the ultra-low sulfur diesel (ULSD) requirement is typically less than about 10 wppm sulfur.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

A hydroprocessing recovery section typically includes a series of separators in a separation section to separate gases from the liquid materials and cool and depressurize liquid streams to prepare them for fractionation into products. Hydrogen gas is recovered for recycle to the hydroprocessing unit. A stripper for stripping hydroprocessed effluent with a stripping medium such as steam is used to remove unwanted hydrogen sulfide from liquid streams before product fractionation.

In addition, in many plants there are additional units that employ hydrogen to further convert hydrocarbons as needed.

Efficient use of hydrogen is critical to the economics of a hydroprocessing unit. In current projects there is a continued need for higher efficiencies. For example, in a complex that consists of a hydrocracking unit, catalytic reforming unit, and aromatics unit that is not including a pressure swing adsorption (PSA) unit, it is desirable to reduce both capital and operating expenses by reducing equipment count and by integrating process operations to improve efficiency.

Sometimes, the complex containing several individual units is offered with a PSA unit to derive pure hydrogen (99.9 mol %) that is used as make-up gas to the hydrocracking unit. This PSA unit is typically fed with catalytic reforming net gas at 300 to 400 psig and produces a hydrogen product at a recovery rate of 85 to 90%. Due to the high value of hydrogen, a method is needed to increase hydrogen recovery from the PSA unit. The overall economics of the complex is sensitive to hydrogen balance/utilization, and it has been found that increasing PSA hydrogen recovery can have a significant benefit.

This invention is intended to improve hydrogen balance across the complex and importantly increase the value of the overall complex by including a PSA unit in the make-up gas compression system of the hydrocracker. Operating this PSA unit at a significantly higher pressure (500 to 1000 psig) increases hydrogen recovery by—3 to 6 percentage points, thereby improving overall economics of the complex. In addition to improved hydrogen recovery, the higher pressure also provides an opportunity to eliminate booster compressors associated with other units in the complex and reduce equipment count. This invention can also be applied to other types of hydroprocessing units.

In current practice (prior art), a conventional (low-pressure) stand-alone PSA unit is typically used to recover high-purity hydrogen from refinery off-gas streams, such as catalytic reforming net gas. This purified hydrogen supplies both low-pressure and high-pressure consumers in the complex. Hydroprocessing units are typically the largest hydrogen consumers, and they operate at a higher pressure than current practice, conventional (low pressure) PSA units. For example, hydrocrackers may operate from about 1500 to about 2500 psig and hydrotreaters may operate from about 500 to about 1800 psig. The high pressure hydrogen consumers typically require multiple stages of make-up gas compression to raise the lower pressure PSA hydrogen to reaction system pressure. Thus, it would be desirable if possible to integrate a high-pressure PSA into a hydroprocessing unit in order to utilize the higher pressure to achieve increased hydrogen recovery.

An important and unexpected feature of this invention is the preferred pressure level of the PSA unit. It has been found that including a PSA unit within a hydroprocessing unit make-up gas compression system, for example, between typical $1^{st}$ and $2^{nd}$ compression stages (about 500 to 1000 psig) provides an economic and increased level of hydrogen recovery. Increasing PSA pressure greater than about 1000 psig that is, between typical $2^{nd}$ and $3^{rd}$ stage compression stages, provides little additional benefit in terms of hydrogen recovery and greatly increases cost. This invention provides a competitive and business advantage by integrating PSA units to provide a synergistic benefit that is not possible with a conventional, stand-alone PSA unit.

In addition, it has been found that reducing PSA feed gas temperature below that which can be achieved with air or water coolers (currently practiced) by using a chiller (refrigeration) provides a benefit to PSA performance. PSA simulation results show that hydrogen recovery increases and bed volume decreases with decreasing feed gas temperature. A preferred feed gas temperature for this application is in the range of 10 to 20° C. This added feature of PSA integration in the make-up gas compression system of hydroprocessing units provides a significant advantage. An important aspect of this invention is the finding that the added capital and operating cost increases due to the use of a chiller is offset by the decrease in costs attributed to downstream compression and the ability to have a smaller size PSA unit. It has been found that the beds may be up to 25% smaller at the lower temperature. Furthermore, the downstream Stage 2 and PSA tail-gas compression power is reduced due to lower compressor inlet temperature. The net result of adding the chiller is a small decrease in costs, and about 1.0 percentage point increase in hydrogen recovery.

SUMMARY OF THE INVENTION

The invention provides a process for providing a hydrogen stream to a process utilizing hydrogen comprising obtaining a gas stream containing hydrogen such as a net gas stream from a catalytic reformer. The gas is then compressed to a high pressure of at least about 500 psig to produce a compressed gas stream. Then the compressed gas stream is sent to a pressure swing adsorption unit containing a plurality of beds with at least 5 pressure equalization steps to produce a hydrogen stream. The hydrogen stream may be sent to a process utilizing hydrogen, or to a compressor system to produce a compressed hydrogen stream that is then sent to a process utilizing hydrogen. In addition, the compressed gas stream may be cooled to a temperature from about 30° C. to about 50° C. to produce a cooled compressed gas stream before the compressed gas stream is sent to the pressure swing adsorption unit. The cooled compressed gas stream may then be further chilled, such as by refrigeration to a chilling temperature from about 10° C. to 20° C. to produce a chilled compressed gas stream before the compressed gas stream is sent to said pressure swing adsorption unit. The chilling temperature may be about 15° C. Typically, about 91 to 95% of hydrogen in the gas stream is recovered. The compressed gas stream may be at a pressure of about 500 to 1,000 psig and more specifically may be at a pressure of about 600 to 900 psig and more specifically may be at pressure of about 650 to 850 psig. The gas stream may be a net gas stream from a catalytic reforming unit. The processes utilizing hydrogen may be selected from the group consisting of hydrocracking, hydrotreating, and other hydrogen consuming processes. While any efficient chilling unit may be used, the cooled compressed gas may be chilled by a vapor compression unit or an absorption chiller. In some embodiments, the compressed hydrogen stream may be further compressed before being sent to a process utilizing hydrogen. The pressure swing adsorption unit is regenerated to produce a tail gas which is then compressed to become a fuel gas. The pressure swing adsorption unit uses a cycle with 5 to 9 pressure equalization steps and may use 6 to 8 pressure equalization steps. The pressure swing adsorption unit contains 12 to 20 beds and in some instances, contains 14 to 18 beds.

DETAILED DESCRIPTION

Figure 1:
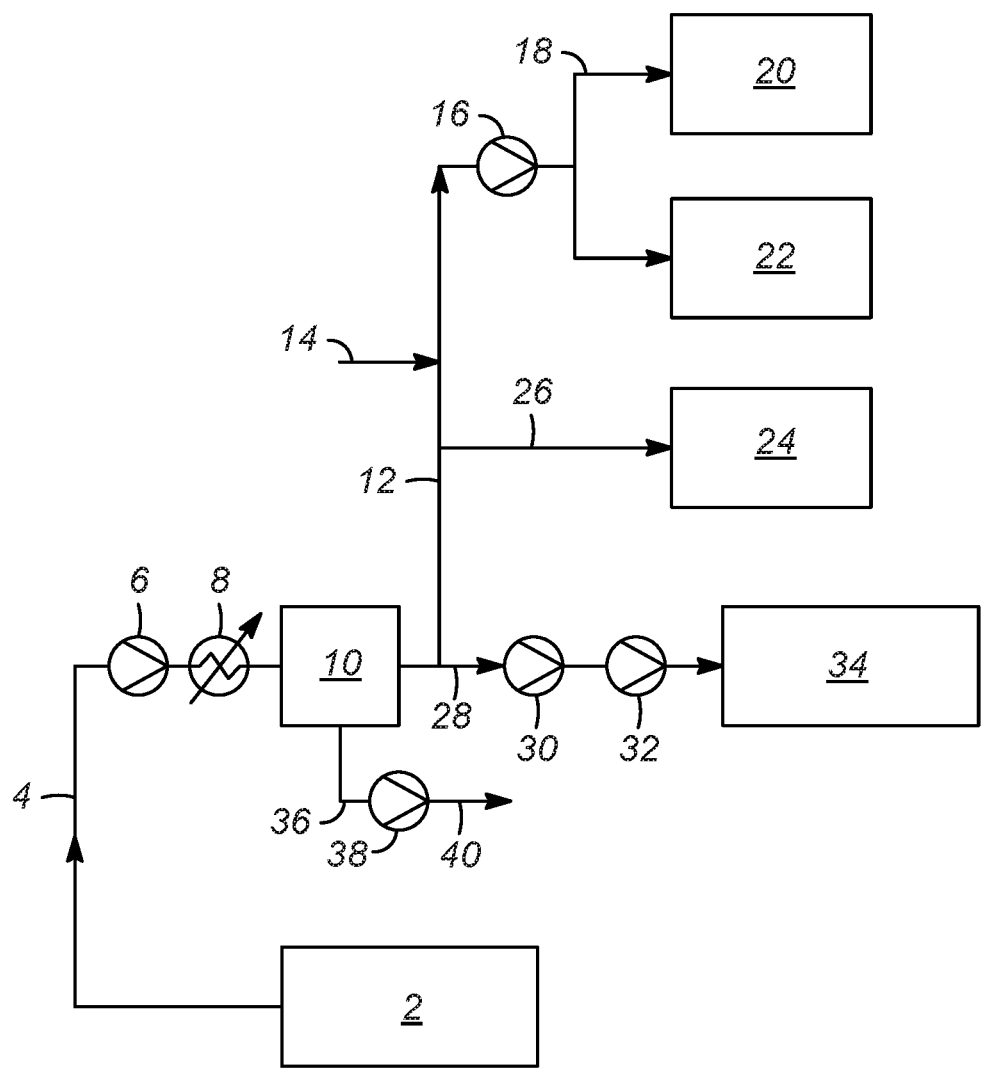
FIG. 1 shows the basic flow scheme to produce hydrogen from a net gas streams.

FIG. 1 shows the basic flow scheme of the present invention. A net gas stream 4 is sent from a continuous catalytic reformer 2. This net gas stream is compressed by compressor 6 and then cooled by heat exchanger 8 and then goes to pressure swing adsorption unit 10 to produce a hydrogen stream 12 and a hydrogen-depleted stream containing hydrocarbons 36 that is sent to compressor 38 to produce fuel gas 40. Hydrogen stream 12 is then divided into several streams with the bulk of the hydrogen being compressed by compressors 30 and 32 to be used in hydrocracker 34. A portion of hydrogen stream 12 may be sent as stream 26 to aromatics processing unit 24 or compressed by compressor 16 with stream 18 being sent to either reactor 20 or 22 as shown in FIG. 1.

Figure 2:
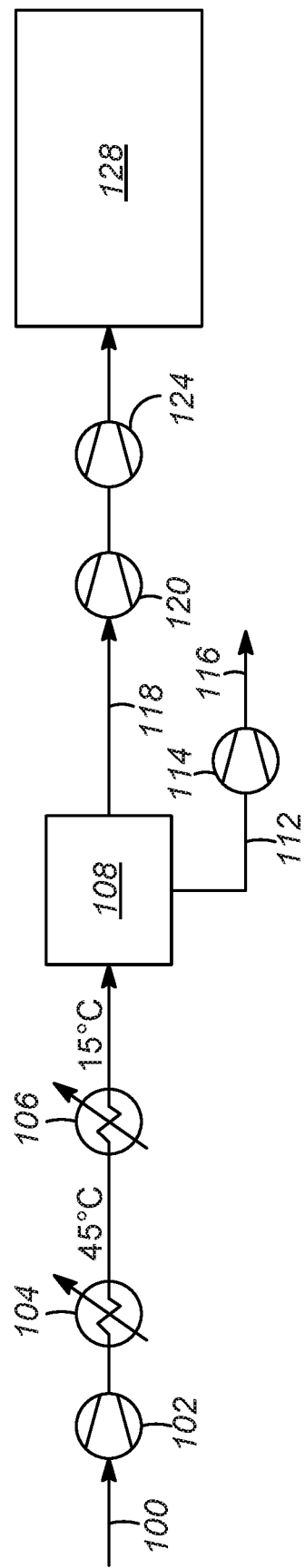
FIG. 2 shows a basic flow scheme with an added chiller to the PSA feed.

FIG. 2 shows a basic flow scheme with the addition of a chiller to the PSA feed. A gas feed stream containing hydrogen and hydrocarbons is sent through compressor 102 and then is cooled to about 45° C. by an air or water cooler 104 followed by chilling to a lower temperature such as 15° C. by chiller 106 to produce a chilled feed gas that is sent to pressure swing adsorption unit 108. A hydrogen product 118 is then sent to compressors 120 and 124 and then to a hydrocracker 128.

Figure 3:
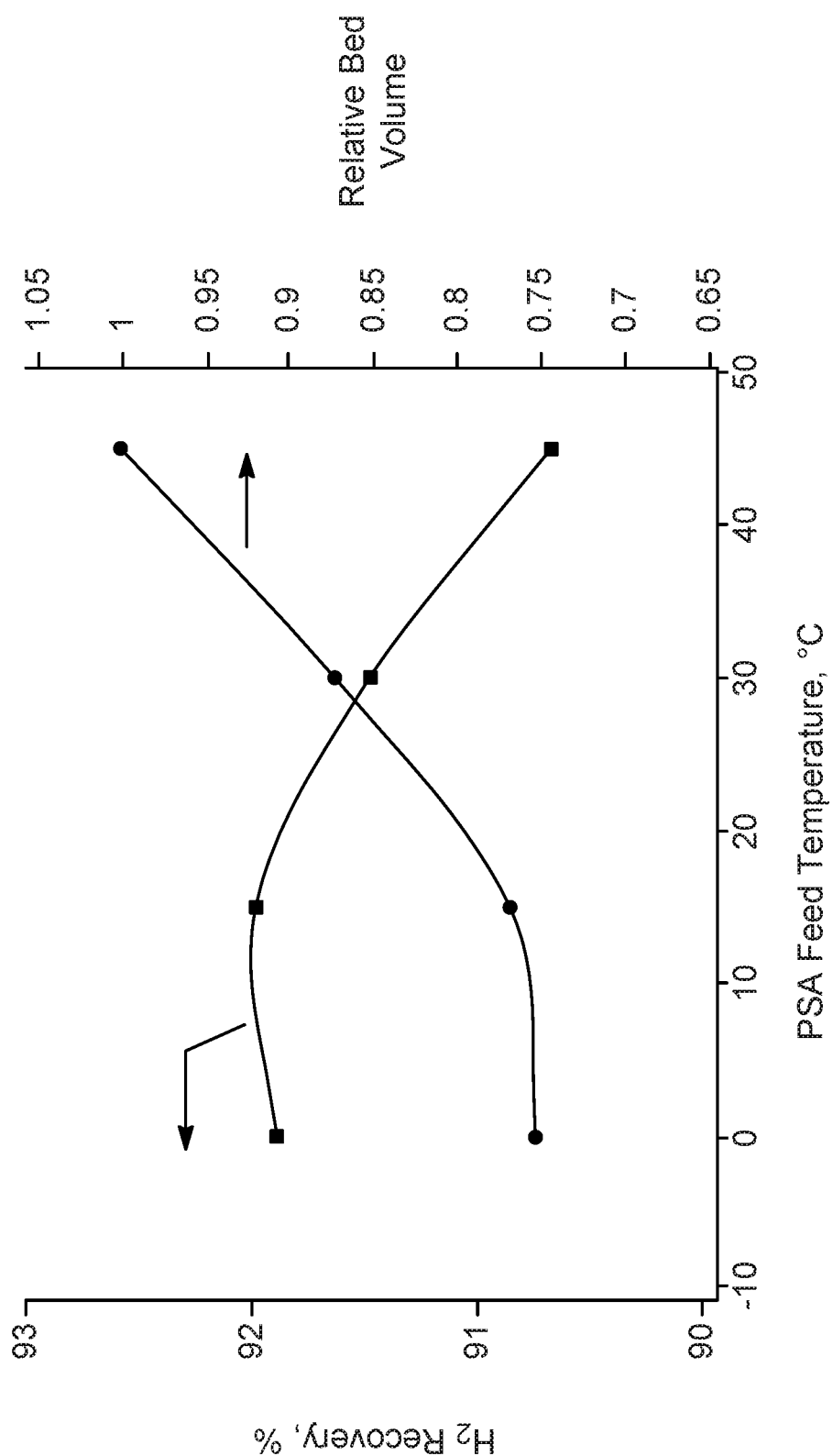
FIG. 3 shows the hydrogen recovery and relative bed volume required at different PSA feed temperatures.

FIG. 3 shows the hydrogen recovery increasing with lower PSA feed temperature as well as bed volume decreasing with lower temperature.

PSA Cycles and Number of Equalization Steps

In order to take advantage of the higher operating pressure, the high-pressure PSA cycle uses a large number of pressure equalization steps (more than 4). This is a new feature of PSA unit design and is required to achieve high levels of hydrogen recovery (reduce blowdown losses). Prior art PSA units currently use 4 or fewer pressure equalization steps (with adsorption pressures typically less than 400 psig). The prior art 14 bed cycle as well as two embodiments of the present invention with high-pressure cycles are shown below (16-3-6 and 18-3-8). These cycles were used in PSA pilot plant testing described below.

TABLE 1

PSA Sub-Cycle Charts

| 14-Bed Cycle with 4 Equalization Steps 14-3-4 | | 16-Bed Cycle with 6 Equalization Steps 16-3-6 | | 18-Bed Cycle with 8 Equalization Steps 18-3-8 | |
|---|---|---|---|---|---|
| ADS | | ADS | | ADS | |
| ADS | | ADS | | ADS | |
| ADS | | ADS | | ADS | |
| EQ1D | EQ2D | EQ1D | EQ2D | EQ1D | EQ2D |
| EQ3D | EQ4D | EQ3D | EQ4D | EQ3D | EQ4D |
| PP | | EQ5D | EQ6D | EQ5D | EQ6D |
| BD | | PP | | EQ7D | EQ8D |
| BD | | BD | | PP | |
| PURGE | | BD | | BD | |
| PURGE | | PURGE | | BD | |
| PURGE | | PURGE | | PURGE | |
| PURGE | EQ4U | PURGE | | PURGE | |
| EQ3U | EQ2U | PURGE | EQ6U | PURGE | EQ8U |
| EQ1U | REP | EQ5U | EQ4U | EQ7U | EQ6U |
| | | EQ3U | EQ2U | EQ5U | EQ4U |
| | | EQ1U | REP | EQ3U | EQ2U |
| | | | | EQ1U | REP |

These tables show an abbreviated form of the overall PSA cycle (called a sub-cycle) and are routinely used by practitioners to capture the minimum amount of required information to represent the complete multi-bed PSA cycle. These sub-cycles are replicated according to known procedures (with each row corresponding to one bed) in order to produce complete cycle charts. It is understood that other variations of cycle details are possible. For example, Table 2 shows another embodiment of an 18-bed cycle, and Table 3 shows the corresponding detailed description for a single bed in the 18-bed unit.

TABLE 2

18-Bed Cycle with 7 Equalization Steps (18-4-7 Cycle)

ADS
ADS
ADS
ADS

TABLE 2-continued

18-Bed Cycle with 7 Equalization Steps (18-4-7 Cycle)

| | |
|---|---|
| EQ1D | EQ2D |
| EQ3D | EQ4D |
| EQ5D | EQ6D |
| EQ7D | PP |
| PP | |
| BD | |
| PURGE | |
| PURGE | |
| PURGE | |
| PURGE | |
| EQ7U | EQ6U |
| EQ5U | EQ4U |
| EQ3U | EQ2U |
| EQ1U | REP |

TABLE 3

Detailed Description of 18-4-7 Cycle in Table 2.

| Step | Abbreviation | Flow Direction | Time* | Starting Pressure, psig | Ending Pressure, psig |
|---|---|---|---|---|---|
| Adsorption | ADS | Up | 4x | 800 | 800 |
| Equalization 1 | EQ1D | Up | 0.5x | 800 | 703 |
| Equalization 2 | EQ2D | Up | 0.5x | 703 | 574 |
| Equalization 3 | EQ3D | Up | 0.5x | 574 | 452 |
| Equalization 4 | EQ4D | Up | 0.5x | 452 | 341 |
| Equalization 5 | EQ5D | Up | 0.5x | 341 | 242 |
| Equalization 6 | EQ6D | Up | 0.5x | 242 | 152 |
| Equalization 7 | EQ7D | Up | 0.5x | 152 | 93 |
| Provide Purge | PP | Up | 1.5x | 93 | 28 |
| Blowdown | BD | Down | x | 28 | 5 |
| Purge | PURGE | Down | 4x | 5 | 5 |
| Equalization 7 | EQ7U | Down | 0.5x | 5 | 64 |
| Equalization 6 | EQ6U | Down | 0.5x | 64 | 145 |
| Equalization 5 | EQ5U | Down | 0.5x | 145 | 235 |
| Equalization 4 | EQ4U | Down | 0.5x | 235 | 337 |
| Equalization 3 | EQ3U | Down | 0.5x | 337 | 450 |
| Equalization 2 | EQ2U | Down | 0.5x | 450 | 570 |
| Equalization 1 | EQ1U | Down | 0.5x | 570 | 659 |
| Re-pressurization | REP | Up | 0.5x | 659 | 800 |

*x = sub-cycle time (ranges from 10 to 40 seconds)

It is important to define the term "number of pressure equalizations". Practitioners in the field make a distinction between the "number of physical equalization steps" and the "number of equivalent (or effective, or actual) equalizations, $N_{eq}$". The number of physical equalization steps is 4, 6, and 8 in the example cycles shown above in Table 1 and 7 physical equalization steps for the cycle shown in Table 2. This is simply the number of bed-to-bed pressure equalization events that happen during the cycle. For any given cycle, the number of equivalent equalizations ($N_{eq}$) is less than the number of physical equalizations because some of the pressure equalizations will be incomplete. This is necessary due to hydraulic limitations (valves and headers) and can be intentional in order to have precise pressure cut-off levels for consistent operational performance and purge-gas generation. The values cited herein that refer to physical equalization steps include the use of 5 to 9 or 6 to 8 pressure equalization steps; the corresponding values for $N_{eq}$ would be "3.5 to 8.0, preferably 4.5 to 7.0". The value of $N_{eq}$ is calculated from measured pressures. Pilot plant data shown below are based on $N_{eq}$.

Examples

Pilot plant testing was conducted in order to demonstrate improved performance (higher recovery of hydrogen and smaller bed size factor) due to: (1) higher adsorption pressure, (2) lower feed temperature, and (3) higher number of pressure equalizations. Tests were made using the feed gas composition shown below. Results are given in the tables below.

| Feed Gas Composition | |
|---|---|
| | Mol % |
| Hydrogen | 90.8 |
| Methane | 3.0 |
| Ethane | 3.0 |
| Propane | 2.0 |
| n-Butane | 0.84 |
| n-Pentane | 0.21 |
| n-Hexane | 0.20 |

PSA Pilot Plant Data for 99.9 mol % Product Hydrogen

| Adsorption Pressure, psig | Feed Temp, ° C. | $N_{eq}$ | Hydrogen Recovery, % | Relative Bed Volume |
|---|---|---|---|---|
| 320 | 45 | 2.8 | 88.9 | 1.00 |
| 700 | 45 | 4.7 | 92.6 | 0.545 |
| 700 | 22 | 4.7 | 93.2 | 0.480 |

PSA Pilot Plant Data for 99.9 mol % Product Hydrogen

| Adsorption Pressure, psig | Feed Temp, ° C. | $N_{eq}$ | Hydrogen Recovery, % |
|---|---|---|---|
| 700 | 22 | 3.5 | 92.2 |
| 700 | 22 | 4.7 | 93.2 |
| 700 | 22 | 6.4 | 93.7 |

Specific Embodiments

While the following is described in conjunction with specific embodiments, it will be understood that this description is intended to illustrate and not limit the scope of the preceding description and the appended claims.

A first embodiment of the invention is a process for providing a hydrogen stream to a process utilizing hydrogen comprising (a) obtaining a gas stream containing hydrogen; (b) compressing the gas stream to a pressure of about 500 to 1000 psig to produce a compressed gas stream; (c) sending the compressed gas stream to a pressure swing adsorption unit containing a plurality of beds with at least 5 pressure equalization steps to produce a hydrogen stream; and (d) sending the hydrogen stream to a hydrogen consuming process. An embodiment of the invention is one, any or all of prior embodiments in this paragraph up through the first embodiment in this paragraph comprising cooling the compressed gas stream to a temperature from about 30° C. to about 50° C. to produce a cooled compressed gas stream before the compressed gas stream is sent to the pressure swing adsorption unit. An embodiment of the invention is one, any or all of prior embodiments in this paragraph up through the first embodiment in this paragraph comprising chilling the cooled compressed gas stream to a chilling temperature from about 10° C. to 20° C. to produce a chilled compressed gas stream before the compressed gas stream is sent to the pressure swing adsorption unit. An embodiment of the invention is one, any or all of prior embodiments in this paragraph in this paragraph up through the first embodiment in this paragraph wherein the chilling temperature is about 15° C. An embodiment of the invention is one, any or all of prior embodiments in this paragraph up through the first embodiment in this paragraph wherein about 93% of hydrogen in the gas stream is recovered. An embodiment of the invention is one, any or all of prior embodiments in this paragraph up through the first embodiment in this paragraph wherein the compressed gas stream is at a pressure of about 600 to 900 psig. An embodiment of the invention is one, any or all of prior embodiments in this paragraph up through the first embodiment in this paragraph wherein the compressed gas stream is at a pressure of about 650 to 800 psig. An embodiment of the invention is one, any or all of prior embodiments in this paragraph up through the first embodiment in this paragraph wherein the gas stream is a net gas stream from a catalytic reforming unit. An embodiment of the invention is one, any or all of prior embodiments in this paragraph up through the first embodiment in this paragraph wherein the process utilizing hydrogen is selected from the group consisting of hydrocracking, hydrotreating, and other hydrogen consuming processes. An embodiment of the invention is one, any or all of prior embodiments in this paragraph up through the first embodiment in this paragraph wherein the cooled compressed gas is chilled by a vapor compression unit or an absorption chiller. An embodiment of the invention is one, any or all of prior embodiments in this paragraph up through the first embodiment in this paragraph wherein the compressed hydrogen stream is further compressed before being sent to a process utilizing hydrogen. An embodiment of the invention is one, any or all of prior embodiments in this paragraph up through the first embodiment in this paragraph wherein the pressure swing adsorption unit is regenerated to produce a tail gas. An embodiment of the invention is one, any or all of prior embodiments in this paragraph up through the first embodiment in this paragraph wherein the tail gas is compressed to become a fuel gas. An embodiment of the invention is one, any or all of prior embodiments in this paragraph up through the first embodiment in this paragraph wherein the pressure swing adsorption unit uses a cycle with 5 to 9 pressure equalization steps. An embodiment of the invention is one, any or all of prior embodiments in this paragraph up through the first embodiment in this paragraph wherein the pressure swing adsorption unit uses a cycle with 6 to 8 pressure equalization steps An embodiment of the invention is one, any or all of prior embodiments in this paragraph up through the first embodiment in this paragraph wherein the pressure swing adsorption unit contains 12 to 20 beds. An embodiment of the invention is one, any or all of prior embodiments in this paragraph up through the first embodiment in this paragraph wherein the pressure swing adsorption unit contains 14 to 18 beds. An embodiment of the invention is one, any or all of prior embodiments in this paragraph up through the first embodiment in this paragraph further comprising sending the hydrogen stream to a compressor to produce a compressed hydrogen stream; and then sending the compressed hydrogen stream to the hydrogen consuming process.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for providing a hydrogen stream to a process utilizing hydrogen comprising
    (a) obtaining a gas stream containing hydrogen;
    (b) compressing said gas stream to a pressure of about 500 to 1000 psig to produce a compressed gas stream;
    (c) sending said compressed gas stream to a pressure swing adsorption unit containing a plurality of beds with at least 5 pressure equalization steps to produce a hydrogen stream; and
    (d) sending said hydrogen stream to a hydrogen consuming process,
        wherein the pressure swing adsorption unit is included within a make-up gas compression system of the hydrogen consuming process.

2. The process of claim 1 comprising cooling said compressed gas stream to a temperature from about 30° C. to about 50° C. to produce a cooled compressed gas stream before said compressed gas stream is sent to said pressure swing adsorption unit.

3. The process of claim 2 comprising chilling said cooled compressed gas stream to a chilling temperature from about 10° C. to 20° C. to produce a chilled compressed gas stream before said compressed gas stream is sent to said pressure swing adsorption unit.

4. The process of claim 3 wherein said chilling temperature is about 15° C.

5. The process of claim 1 wherein about 93% of hydrogen in said gas stream is recovered.

6. The process of claim 1 wherein said compressed gas stream is at a pressure of about 600 to 900 psig.

7. The process of claim 1 wherein said compressed gas stream is at a pressure of about 650 to 800 psig.

8. The process of claim 1 wherein said gas stream is a net gas stream from a catalytic reforming unit.

9. The process of claim 1 wherein said process utilizing hydrogen is selected from the group consisting of hydrocracking, hydrotreating, and other hydrogen consuming processes.

10. The process of claim 3 wherein said cooled compressed gas is chilled by a vapor compression unit or an absorption chiller.

11. The process of claim 1 wherein said compressed hydrogen stream is further compressed before being sent to a process utilizing hydrogen.

12. The process of claim 1 wherein said pressure swing adsorption unit is regenerated to produce a tail gas.

13. The process of claim 12 wherein said tail gas is compressed to become a fuel gas.

14. The process of claim 1 wherein said pressure swing adsorption unit uses a cycle with 5 to 9 pressure equalization steps.

15. The process of claim 1 wherein said pressure swing adsorption unit uses a cycle with 6 to 8 pressure equalization steps.

16. The process of claim 1 wherein said pressure swing adsorption unit contains 12 to 20 beds.

17. The process of claim 1 wherein said pressure swing adsorption unit contains 14 to 18 beds.

18. The process of claim 1 further comprising sending said hydrogen stream to a compressor to produce a compressed hydrogen stream; and then sending the compressed hydrogen stream to said hydrogen consuming process.

\* \* \* \* \*